United States Patent [19]

Beck et al.

[11] 3,819,548

[45] June 25, 1974

[54] AN ELECTROCOATING COMPOSITION CONTAINING AN ACID BINDER PRESENT AS THE SALT OF AN ARYLAMINE, ALKYNYL AMINE, QUATERNARY AMMONIUM HYDROXIDE OR PHOSPHONIUM HYDROXIDE

[75] Inventors: Fritz Beck; Guenther Sabelus; Roman Fischer, all of Ludwigshafen; Juergen Haufe, Lambsheim, all of Germany

[73] Assignee: BASF Aktiengesellschaft, Ludwigshafen/Rhein, Germany

[22] Filed: Dec. 3, 1971

[21] Appl. No.: 204,701

[52] U.S. Cl. ............ 260/18 R, 204/181, 260/19 N, 260/22 CB, 260/23 R, 260/24, 260/29.2 E, 260/29.2 NR, 260/29.6 ME, 260/29.6 MN, 260/30.6 R, 260/32.4, 260/32.6 R
[51] Int. Cl. ...................... C08g 51/44, C08g 51/50
[58] Field of Search ...... 260/23 R, 24, 22 CB, 18 R, 260/75 R, 19 N, 78.4 E, 29.2 E, 29.6 ME, 30.6 R, 32.4, 32.6 R, 29.2 VA, 29.6 MN

[56] References Cited
UNITED STATES PATENTS

| | | | |
|---|---|---|---|
| 3,294,728 | 12/1966 | Kuhlkamp et al. | 260/29.6 |
| 3,445,411 | 5/1969 | Dunham et al. | 260/29.2 |
| 3,491,011 | 1/1970 | LeBras et al. | 260/29.2 |
| 3,515,689 | 6/1970 | Brane et al. | 260/29.2 |
| 3,594,339 | 7/1971 | Palaika | 260/29.2 |
| 3,629,169 | 12/1971 | Bedighian | 260/29.2 |

*Primary Examiner*—Donald E. Czaja
*Assistant Examiner*—Eugene C. Rzucidlo
*Attorney, Agent, or Firm*—Johnston, Keil, Thompson, & Shurtleff

[57] ABSTRACT

In an electrocoating process acid binders which are present at least partly in the form of their salts with basic compounds are used and the basic compounds used for salt formation consist of the extent of 0.1 to 50 percent of the neutralization equivalent of the acid binder of at least one arylamine and/or alkynylamine and/or quaternary ammonium hydroxide and/or phosphonium hydroxide with at least one aromatic ligand, and other conventional additives and non-basic corrosion inhibitors may be contained in the aqueous solution or dispersion of the coating composition. The process is suitable for the production of particularly corrosion-resistant coatings on metal articles.

15 Claims, No Drawings

AN ELECTROCOATING COMPOSITION CONTAINING AN ACID BINDER PRESENT AS THE SALT OF AN ARYLAMINE ALKYNYL AMINE QUATERNARY AMMONIUM HYDROXIDE OR PHOSPHONIUM HYDROXIDE

The present invention relates to a process for the production of coatings showing improved corrosion resistance on electrically conducting surfaces by electrodeposition. The invention also relates to the coating compositions used.

It is known that coatings can be prepared on electrically conducting surfaces, particularly on metal articles, by depositing an acid binder present as a salt in aqueous solution or dispersion onto the article to be coated forming an anode and then baking it. Alkali metal hydroxides, ammonia, or aliphatic or cycloaliphatic amines are generally used as basic compounds for salt formation.

The coatings obtained therewith do not however exhibit entirely satisfactory resistance to corrosion such as is important for metal surfaces, particularly for priming iron surfaces. It is known that the pretreatment of iron (phosphatizing) and the protective effect of priming cooperate and that corrosion resistance which is imparted by priming can be influenced by the structure of the binder and the composition, by the type and amount of solvent added and also by the choice of suitable pigments; chemical modification of the binder should however not affect the other properties such as film formation, bond strength and behavior upon deposition.

It is an object of the invention to provide a process for the production of coatings on metal articles by electrodeposition which ensures better resistance to corrosion of the metal surface without affecting the processing characteristics and other properties of the coating material.

This object is achieved, surprisingly, by replacing some of the basic compound conventionally used for salt formation with the acid binder by an arylamine and/or alkynylamine and/or quaternary ammonium hydroxide and/or phosphonium hydroxide.

The present invention resides in a mixture in which from 0.1 to 50 percent of the neutralization equivalent of the acid binder is present as a salt of at least one arylamine and/or alkynylamine and/or quaternary ammonium hydroxide and/or phosphonium hydroxide with at least one aromatic ligand, with or without the addition of a conventional non-basic corrosion inhibitor.

The invention also resides in the use of this mixture in a process for the production of coatings on conducting surfaces by electrodeposition wherein an acid binder which is at least partly present in the form of its salt with a basic compound and is dissolved or dispersed in water, mixed if desired with other, conventional, additives is deposited on an electrically conducting surface forming an anode, and the basic compounds used for salt formation contain from 0.1 to 50 percent of the neutralization equivalent of the acid binder of at least one arylamine and/or alkynylamine and/or quaternary ammonium hydroxide and/or phosphonium hydroxide with at least one aromatic ligand, with or without a conventional non-basic corrosion inhibitor.

The following details are given regarding the individual components contained in the mixture according to the invention;

polycarboxylic acid resins, i.e. products containing carboxyl groups and generally having an acid number of from 20 to 400, preferably from 30 to 250, conventionally used in electrocoating are suitable as acid binders. The polycarboxylic acid resins may be from the class of polycondensates, polyadducts or polymers or combinations of the same. It is preferred to use polycarboxylic acid resins or mixtures thereof with other resins which, for example by baking, autoxidative drying, electrochemically or by radiation, are crosslinked by way of polyaddition, polycondensation or polymerization reactions.

Examples of suitable polycondensates are unsaturated polyesters and alkyd resins with free carboxyl groups such as polycondensation products of polyhydric alcohols and at least partly $\alpha$, $\beta$-olefinically unsaturated dicarboxylic acids or dicarboxylic anhydrides, as for example reaction products (obtained by conventional methods such as by melt condensation or by condensation under azeotropic conditions) of linear or branched alkanediols with two to eight carbon atoms with maleic acid or anhydride or fumaric acid or mixtures of these dicarboxylic acids with saturated aliphatic, possibly partly unsaturated cycloaliphatic or aromatic polycarboxylic acids, particularly dicarboxylic acids, as for example glutaric acid, adipic acid, cyclohexanedioic acid, tetrahydrophthalic acid, o-phthalic acid, isophthalic acid and terephthalic acid, or benzenetricarboxylic or benzenetetracarboxylic acids.

Suitable alkyd resins are those having free carboxyl groups, as for example polycondensation products of polyhydric alcohols such as glycerol and neopentyl glycol, and polycarboxylic acids, as for example o-phthalic acid, isophthalic acid and terephthalic acid, particularly those which contain condensed therein additional long-chain, preferably olefinically unsaturated, natural or synthetic fatty acids or their monoglycerides or diglycerides, which have been obtained for example from oils such as linseed oil, wood oil, tung oil or cashew nut oil. The product of these alkyd resins is described for example in the book by D. H. Solomon, "The Chemistry of Organic Film Formers," (1967), John Wiley & Sons, Inc., pages 72 et seq. and pages 280 et seq.

Polyadducts such as maleic oils and expoxide esters are also suitable acid binders. Examples of suitable maleic oils are obtained for example by boiling oils containing olefinically unsaturated fatty acids, as for example linseed oil, wood oil or dehydrated castor oil, with $\alpha$, $\beta$-olefinically unsaturated polycarboxylic acids, particularly dicarboxylic acids, as for example maleic acid and fumaric acid or their derivatives, as for example their anhydrides, e. g. maleic anhydride.

Other suitable maleic oils are those which have been modified with resin acids, adducts of resin acids and maleic acid and/or phenol/formaldehyde condensation products. Maleic oils which have been converted with monohydric or polyhydric alcohols, for example 1,2-propylene glycol, into the corresponding hemiesters, may also be used. The composition and production of these products is also described for example in the book by K. Wiegel, "Elektrophorese-Lacke" (Stuttgart 1967) pages 105 to 106, and in the book by D. H. Solomon, "The Chemistry of Organic Film Formers" (John Wiley & Sons, Inc.), pages 192 to 201 and pages 295 et seq.

Copolymers containing carboxyl groups which have been made dilutable with water by the addition of basic substances, if necessary in the presence of water-dilutable organic solvents, and are therefore soluble in water or at least can form a stable dispersion therein, are also suitable as acid binders based on polymers.

Copolymers of olefinically unsaturated monocarboxylic or dicarboxylic acids, as for example acrylic acid, methacrylic acid, crotonic acid, maleic acid, fumaric acid, itaconic acid, mesaconic acid, citraconic acid and maleic monoesters of alkanols with one to twenty carbon atoms, as for example monobutyl maleate or mono-2-ethylhexyl maleate, with conventional non-acid comonomers are suitable copolymers.

Suitable comonomers of the olefinically unsaturated carboxylic acids are conventional copolymerizable olefinically unsaturated organic compounds such as aliphatic or cycloaliphatic hydrocarbons, as for example ethylene, propylene, isobutylene, vinylcyclopentane, vinylcyclohexane, vinylaromatic hydrocarbons, which may bear alkyl substituents, as for example styrene, vinyltoluene or α-methylstyrene, and also esters of α,β-unsaturated carboxylic acids having three to five carbon atoms with monoalkanols of one to twenty carbon atoms, as for example the esters of acrylic acid and/or methacrylic acid with methanol, ethanol, propanol, isopropanol, butanol, isobutanol, tert.-butanol, 2-ethylhexanol, lauryl alcohol or stearyl alcohol, monomers containing hydroxyl groups such as monoesters of α,β-unsaturated monocarboxylic acids with three to five carbon atoms with polyhydric, particularly dihydric, alcohols with two to ten carbon atoms, or oxaalcohols, as for example monoesters of acrylic acid or methacrylic acid with ethylene glycol, propylene glycol, butanediol-1,4, 2-ethylhexanediol-1,6, diethylene glycol or neopentyl glycol, vinyl esters of linear or branched monocarboxylic acids with one to twelve carbon atoms, as for example vinyl acetate, vinyl propionate, vinyl butyrate, vinyl esters of branched synthetic carboxylic acids with up to eleven carbon atoms, as for example vinyl pivalate or vinyl esters of versatic acids having nine and/or eleven carbon atoms; acrylonitrile, methacrylonitrile, acrylamide, methacrylamide, and monomers which impart heat-curable properties to the copolymer such as N-methylolacrylamide, N-methylolmethacrylamide, and ethers of the same with alcohols with one to eight carbon atoms or S-vinylthioethanol; the following are also suitable as comonomers: olefinically polyunsaturated compounds as for example butadiene, oligomers of butadiene, oils containing polyunsaturated fatty acids, if desired mixed with resin acids, as for example linseed oil, dehydrated castor oil and tall oil, and the free fatty acids and mixtures of fatty acids and resin acids obtained therefrom by hydrolysis.

Small amounts of the following may also be added as comonomers: other olefinically polyunsaturated compounds, as for example divinylbenzene or esters of acrylic acid and/or methacrylic acid with polyhydric alcohols or oxaalcohols, as for example glycol diacrylates, glycol dimethacrylates, butanediol-1,4 diacrylate and butanediol-1,4 dimethacrylate.

Examples of suitable binders based on polymers are copolymers of from 50 to 90 percent by weight of butyl acrylate, methyl methacrylate, ethyl acrylate or a mixture of one or more of these esters with styrene, from 5 to 15 by weight of acrylic acid or methacrylic acid, from 10 to 30 percent by weight of acrylamide and/or methacrylamide and/or N-methylolacrylamide and/or N-methylolmethacrylamide and/or an ether of N-methylolacrylamide and/or N-methylolmethacrylamide with an alcohol of one to eight carbon atoms, and up to 15 percent by weight of ethylene glycol monoacrylate or butanediol-1,4 monoacrylate or monomethacrylate and/or up to 20 percent by weight of linseed oil or tall oil.

The production of such copolymers from the individual components is generally carried out by conventional methods, advantageously by the method of solution polymerization, i.e. polymerization is carried out in solvents, for example alcohols, ethers, ketones and/or alkyl-substituted benzene hydrocarbons, in which both the monomers and the polymers are soluble, in the presence of conventional free radical polymerization catalysts, as for example organic peroxides or hydroperoxides or azodiisobutyronitrile, if desired with the addition of conventional regulators (for example dodecylmercaptan or diisopropyl xanthodisulfide), advantageously in a temperature range from about 50° to about 120°C.

These copolymers generally have a K value of 12 to 30 measured in the acid binder in a suitable organic solvent according to the method of H. Fikentscher, Cellulosechemie, 13, 58 (1932).

The abovementioned acid binder may be contained in the mixture according to the invention by itself, in combination with one or more others or in combination with other binders conventionally used for electrocoating, as for example water-compatible phenoplast or aminoplast condensates.

The basic substances suitable for salt formation of the acid binder may be alkali hydroxides, as for example potassium or sodium hydroxides, alkali metal carbonates, alkali metal bicarbonates, alkali metal alkoxides and preferably volatile water-soluble basic compounds such as ammonia or organic aliphatic or cycloaliphatic primary, secondary and/or preferably tertiary amines of two to ten carbon atoms which may bear hydroxyl groups on the organic radical or hydrogenated nitrogenous heterocycles, for example butylamine, diethylamine, triethylamine, diisopropylamine, dietanolamine, triethanolamine, cyclohexylamine, diisopropanolamine, dimethylethanolamine, piperidine or morpholine.

The basic substances used for salt formation of the acid binder contain, according to the invention, up to 50 percent of the neutralization equivalent of the acid binder of at least one arylamine and/or alkynylamine and/or quaternary ammonium and/or phosphonium hydroxide having at least one aromatic ligand.

Suitable arylamines are those of the general formula:

in which R denotes a phenyl or napthyl radical which may bear as substituents one or more alkyl, oxyalkyl, oxaalkyl or alkoxyl groups of one to eight carbon atoms or aryl or aralkyl groups of seven to 20 carbon atoms, nitro groups, halogen atoms, carboxylic ester groups, sulfonic ester groups, alkylsulfone groups, alkylsulfoxide groups, alkyl sulfide groups or sulfhydryl groups, and $R^1$ and $R^2$ may be identical or different and each denotes a hydrogen atom or an alkyl, oxaalkyl and/or hydroxyalkyl radical of one to four carbon atoms or an aralkyl radical of seven to twenty carbon atoms.

Examples of suitable arylamines are aniline, toluidine, xylidine, α-naphthylamine, β-naphthylamine, anisidine, phenetidine, N-ethylaniline, N-methylaniline, N-methyltoluidine, N-hydroxyethylaniline, N-methylxylidine, N,N-dimethylaniline, N,N-diethylaniline, N-methyl-N-ethylaniline, N,N-dimethyltoluidine, N,N-dimethylxylidine, α-naphthyldimethylamine, β-naphthyldimethylamine, N-ethyl-N-hydroxyethylaniline, N,N-di(hydroxyethyl)-aniline, N,N-di(hydroxyethyl)-m-tolvidine, p-chloroaniline, o-bromo-N-methylaniline and m-nitrotoluidine.

N-hydroxyalkyl substituted arylamines are particularly suitable.

Examples of suitable alkynylamines are those of the general formula:

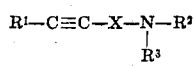

in which $R^1$, $R^2$ and $R^3$ may be identical or different and each denotes a hydrogen atom or a linear or branched alkyl radical of one to four carbon atoms which may bear hydroxy, alkoxy or acyloxy groups as substituents, and X denotes an alkylene radical of one to four carbon atoms. Alkynylamines having this general formula are preferred in which $R^1$ denotes —H, —$CH_2OH$,

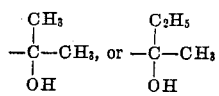

and $R^2$ and/or $R^3$ denotes —$CH_3$, —$C_2H_5$, —$C_2H_4OH$ or —$C_3H_6OH$, for example 3-dimethylaminopropyne-1, 3-diethylaminopropyne-1, 3-diethanolaminopropyne-1, 3-diisopropanolaminopropyne-1, 3-(methylethanolamino)-propyne-1, 3-(ethylethanolamino)-propyne-1, 4-diethanolaminobutyn-(2)-ol-(1) and 4-hydroxy-4-methylpentyne-2.

N-hydroxyalkylaminoalkynyl compounds are particularly suitable. Alkynylamines in which $R^2$ and/or $R^3$ in the above general formula denote oxaalkanol radicals are also suitable.

Examples of suitable quaternary ammonium hydroxides having at least one aromatic ligand on the amino nitrogen are those of the general formula:

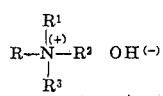

in which R denotes an aryl or aralkyl radical of six to ten carbon atoms which may bear alkyl, oxyalkyl, oxaalkyl, nitro, halogen, carboxylic ester, sulfonic ester, alkylsulfone, alkylsulfoxide, alkylsulfide, sulfhydryl or alkoxyl groups as substituents, and $R^1$, $R^2$ and $R^3$ may be identical or different and may have the same meanings as R or may denote a linear, branched or cyclic alkyl radical of one to twenty carbon atoms, as for example phenyltrimethylammonium hydroxide, tolyltriethylammonium hydroxide, diphenyldimethylammonium hydroxide, β-naphthyltrimethylammonium hydroxide, benzyltrimethylammonium hydroxide, benzyltributylammonium hydroxide, benzyldimethyllaurylammonium hydroxide, dibenzyldimethylammonium hydroxide, p-chlorophenyltrimethylammonium hydroxide and m-nitrophenyltriethylammonium hydroxide.

Examples of suitable quaternary phosphonium hydroxides bearing at least one unsubstituted or alkylsubstituted aromatic ligand on the phosphorus atom are those of the general formula:

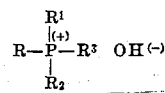

in which R, $R^1$, $R^2$ and $R^3$ have the meanings given in the above general formula for the quaternary ammonium compounds, as for example triphenylbenzylphosphonium hydroxide, triphenyl-p-tritylphosphonium hydroxide and dibenzyldiphenylphosphonium hydroxide.

Mixtures of the basic substances according to the invention are also very suitable.

Mixtures of bases according to the invention with non-basic corrosion inhibitors, as for example butynediol, triarylphosphines or dibenzylsulfoxide, also give an outstanding protective action. It is substantially greater than when only the non-basic inhibitors are added. The non-basic corrosion inhibitors are expediently contained in the liquor to be used for electrocoating in an amount of from 0.01 to 5 percent, preferably from 0.1 to 1 percent, by weight based on the total weight of coating liquor.

The concentration of the bases depends on their activity and the solubility of the salts formed with the binder. From 0.1 to 50 equivalent percentage of the conventional basic compounds is replaced by bases according to the invention. In the case of complete neutralization of the acid binder, there is a degree of neutralization of 50 to 99.9 percent, preferably 75 to 99.9 percent with the conventional basic compounds, for example aliphatic amines, and a degree of neutralization of 50 to 0.1 percent, preferably 25 to 1 percent, with the basic substances according to the invention.

The bases are advantageously added to the binder which has not been neutralized, with or without the addition of conventional at least partly water-soluble organic solvents, as for example lower or higher alcohols such as methanol, isopropanol, butanol, isobutanol and/or $C_8$ to $C_{15}$ alcohols, glycol ethers, ketones and/or fully demineralized water, and the whole homogenized in a conventional mixer with or without a pigment. Mixing with the pigment is conveniently carried out in a suitable grinder, for example in a cone mill, in an agitator ball mill or a three-roll mill. Dilution by further addition of fully demineralized water is carried out only after complete homogenization and stirring is continued for some hours after the final concentration has been reached. Because quaternary phosphonium hydroxides are decomposable, they have to be freshly prepared immediately prior to addition to the binder. They are used as from 0.1 to 0.5 molar solutions in a mixture of water and methanol. After neutralization, the quaternary phosphonium salts of the binder are completely stable.

For the production of the electrocoating composition the mixture according to the invention is diluted with fully demineralized water to a final content of about 5 to 20 percent. The following are further conventional additives: pigments and fillers, antisedimentation agents, antifoams, flow improvers, stabilizers and antioxidants.

Examples of suitable pigments and fillers are inorganic substances such as titanium dioxide (rutile), chromium trioxide, iron oxides, heavy spar, talc, metal powders, carbon black or selected organic pigments, alone or mixed together. The ratio by weight of pigment to binder is within the range from 0.1 to 1 part of pigment per part of solid binder.

The metal article to be coated, for example sheet iron of any shape, is arranged in a liquor of the said composition as the anode for electrocoating.

Prior to coating, the metal to be coated is usually subjected to a pretreatment. In the case of iron this generally involves removal of rust, degreasing and phosphatizing. The protection against corrosion achieved by the process of the invention is in many cases so good that phosphatizing can be dispensed with.

The deposition parameters are changed only insignificantly by the addition of the corrosion inhibitor. Deposition is usually carried on for one to three minutes at constant potential. Poetentials are from 30 to 500 volts. In some cases a voltage program is followed in which the final potential is higher than the initial potential. The temperature in the coating liquor is within the range from 20° to 50°C, preferably from 25° to 40°C. Care should be taken to provide adequate convention in the bath in order to remove Joule's heat and to prevent sedimentation of the pigment.

When a uniform coating has formed on the metal article (also on the portions facing away from the counterlectrode) the article is removed from the bath, rinsed with water and baked for about half an hour at 150° to 200°C under conventional baking condtions. Films having excellent corrosion resistance are thus obtained.

In order to show the favorable effect of the bases according to the invention on corrosion resistance, a comparison is made in each of the following Examples with a test metal sheet which has only been coated in a conventional electrocoating bath, i.e. which contains for example only an aliphatic amine as the base.

The parts and percentages givne in the Examples are by weight.

EXAMPLE 1

318 g of a 55 percent formulation in a mixture of 40 parts n-butanol and 60 parts isobutanol of a commercially available acid acrylate resin which has an acid number of 40 and a K value of 22 (referred to the solids content) is ground with 10.15 g of dimethylethanolamine (DMEA) 120 g of water and 88 g of titanium dioxide (Kronos RN 59) in a cone mill, diluted in portions with 1214 g of water and stirred for another twelve hours. 1750 g of an electrocoating liquor is obtained which contains 10 percent of binder and 5 percent of pigment. The binder is neutralized to the extent of 100 percent with the aliphatic amine (degree of neutralization $\alpha$ = 100 percent). This liquor serves for coating sheet metal for comparison purposes.

There now follows the description of the production of a number of electrocoating liquors by the process of the invention in which the same components are used in the same amounts and in the same sequence but with the exception that a portion of the aliphatic amine (2 to 20 percent) is replaced by a base according to the process of the invention. These bases all contain aromatic groups. The percentages relate to the degree of neutralization.

a. Trimethylbenzylammonium hydroxide 8.14 g of DMEA (80 percent) and 44.6 ml of a commercially available solution of trimethylbenzylammonium hydroxide (Triton B) 20 percent 0.512 molar in 50 percent methanol are mixed as described above. The finished bath is homogeneous. A sample which has not been pigmented is almost clear.

b. Triphenylbenzylphosphonium hydroxide (POH I)

27.2 g of triphenylbenzylphosphonium chloride (= 70 millimoles) obtained from triphenyl phosphine and benzyl chloride is dissolved in 100 ml of 70 percent methanol. While stirring intensely, 12.16 g (52.5 millimoles, a 1.5 excess) of $Ag_2O$ is added at 0°C and stirring continued for ten minutes. The precipitate is then suction filtered with a glass filter crucible, washed with cooled 70 percent methanol and made up to 200 ml. Immediate titration shows a content of POH I of 0.27 mole per liter (theoretical value: 0.35 mole/liter). The chloride content of the solution is less than 1 millimole per liter. The solution of the phosphonium hydroxide has to be processed quickly because the half-life period of the decomposition at 25°C is about forty minutes.

8.14 g of DMEA (80 percent) and 85 ml of the 0.27 molar solution of phosphonium hydroxide (20 percent) are mixed as described above. The finished bath is homogeneous. An unpigmented sample is milky white.

c. Triphenyl-p-tritylphosphonium hydroxide (POH II)

18.8 g of triphenyl-p-tritylphosphonium chloride (35 millimoles) prepared from triphenyl phosphine and trityl chloride in acetonitrile is dissolved in 50 ml of 70 percent methanol. While stirring intensely, 6.08 g (26.2 moles, an excess of 1.5) of $Ag_2O$ is added at 0°C and the whole is further stirred for ten minutes. The precipitate is then suction filtered with a glass filter crucible, washed with cooled solvent and made up to 100 ml. Immediate titration shows a content of 0.25 mole per liter of POH II:

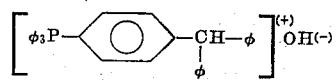

10.0 g of DMEA ($\alpha$ = 98 percent) and 9.2 ml of the freshly prepared phosphonium hydroxide solution ($\alpha$ = 2 percent) are mixed as described above. The finished bath is homogeneous. An unpigmented sample is milky white.

d. N,N-bis-(2-hydroxyethyl)-m-toluidine (Toluidine)

8.14 g of DMEA (80 percent) and 4.5 g of N,N-bis-(2-hydroxyethyl)-m-toluidine (20 percent, technical grade) are incorporated as described above into the binder. The finished bath is homogeneous. An unipigmented sample is opaque translucent.

e. Ethyloxyethylanilin (Aniline)

9.64 g of DMEA (95 percent) and 0.94 g of ethyloxyethylaniline (5 percent, technical grade) are incorporated as described above into the binder. The finished bath is homogeneous. An unpigmented sample is almost clear.

The baths described above are used for coating bonderized and non-bonderized sheet iron having a surface area of about 2 dm² while agitating the bath well. Table 1 gives the deposition data for the bonderized sheet metal (Bonder 125). After deposition the coating is rinsed with distilled water and baked for fifteen minutes at 180°C. The sheet metal is then provided with a cross cut and subjected to the ASTM salt spray test (B 117 – 64). The width of the zones of rust and blistering at the cross cut is given after forty-eight hours and twenty-four hours in Table I.

It will be seen that in spite of the low concentration of the additive (in some cases less than 0.1 percent) there is a clear improvement in the resistance to corrosion even in the case of sheet metal which has not been bonderized.

a. $\alpha = 10$ percent; 2 mm rust zone, 7 mm blister zone b. $\alpha = 50$ percent; 3 mm rust zone, 8 mm blister zone.

Particularly in the case of the bonderized sheet metal there is a very considerable improvement in the corrosion resistance as compared with the comparative sheet metal with 100 percent of DMEA (see Table 1).

EXAMPLE 3

This example deomstrates the effectiveness of a mixture of arylamines with 2-butynediol-(1,4).

In each case 1 percent of commercial butynediol (based on the total mixture) is dissolved in the liquor prepared according to Example 1(d) and 1(e), which contains the acid acrylate resin which has been neutralized with DMEA ($\alpha = 80$ and 95 percent) and N,N-bis-(2-hydroxyethyl)-m-toluidine ($\alpha = 20$ percent) or DECOMPOSITION CONDITIONS AND RESULTS OF ASTM SALT SPRAY TESTS IN THE CASE OF ARYLAMINE AND ARYL-SUBSTITUTED AMMONIUM AND PHOSPHONIUM BASES

| Base system | Degree of neutralization | Deposition conditions for bonderized sheet iron j mA/cm² | | | | ASTM salt spray test 48 h bonderized sheet | | | 24 h blank sheet iron | | |
|---|---|---|---|---|---|---|---|---|---|---|---|
| | | U(V) | $\tau$ (sec) | after 0.1$\tau$ | after $\tau$ | d($\mu$) | mm rust at cut | mm blisters at cut | d($\mu$) | mm rust at cut | mm blisters at cut |
| DMEA (Comparison) | 100 | 120 | 90 | 2.0 | 0.8 | 30 | 3 | 9 | 28 | 7 | 12 |
| (a) DMEA + trimethylbenzyl ammonium hydroxide | 80/20 | 45 | 60 | 4.5 | 0.7 | 30 | 1 | 3.5 | — | — | — |
| (b) DMEA + POH I | 80/20 | 70 | 60 | 3.5 | 0.8 | 34 | 1 | 6 | 32 | 0.5 | 5 |
| (c) DMEA + POH II | 98/2 | 110 | 60 | 6.0 | 1.0 | 30 | 0.5 | 5 | 27 | 0.5 | 5 |
| (d) DMEA + "toluidine" | 80/20 | 40 | 45 | 5.0 | 1.6 | 26 | 0.7 | 2 | 31 | 4 | 10 |
| (e) DMEA + "aniline" | 95/5 | 70 | 45 | 4.5 | 1.3 | 27 | 0.5 | 2 | — | — | — |

$\tau$ = duration of the deposition.
d = thickness of the coating.

The differences are not so pronouned in the Kesternich test (atmosphere containing SO₂). After four cycles (each of eight hours), there is 0.5 mm of rust at the cut in the comparative sheet and many brown flecks and many very small blisters at the cut and on the surface. Particularly in the case of systems (b) and (c), although there is also a rust zone of 0.5 mm at the cut, the number of brown flecks and small blisters at the cut and on the surface is clearly decreased.

EXAMPLE 2

As an example of an alkynylamine, 10 and 50 percent of the DMEA in the acrylate resin described in Example 1 is replaced by diethanolaminopropyne CH ≡ C-CH₂—N2CH₂OH)₂. The corresponding amount of alkynylamine is 1.63 and 8.15 g.

Deposition on the bonderized sheet metal is carried out with:

a. $\alpha = 10$ percent; U = 90 volt; 60 sec.$j_{end} = 0.9$ mA/cm² b. $\alpha = 50$ percent; U = 70 volt; 60 sec.$j_{end} = 0.6$ mA/cm²

The thickness of the coating is 25 to 27 microns. The ASTM salt spray test gave the following values at the cross cut:

In the case of bonderized sheet metal after 48 hours:
  a. $\alpha = 10$ percent; 0.4 mm rust zone, 4 mm blister zone
  b. $\alpha = 50$ percent; 0.2 mm rust zone, 2 mm blister zone.

In the case of unbonderized sheet metal after 24 hours:

ethyloxyethylaniline ($\alpha = 5$ percent).

For further comparison, a coating liquor is prepared which has been neutralized only with DMEA ($\alpha = 100$ percent) but which also contains 1% of commercial butynediol.

Deposition is carried out on bonderized sheet metal with:

a. 20 percent of N,N-bis-(2-hydroxyethyl)-m-toluidine +1 percent of butynediol: 100 volt; 60 sec.$j_{end} = 1.0$ mA/cm²; d = 29 microns;

b. 5 percent of ethyloxyethylaniline + 1 percent of butynediol; 130 volt; 60 sec.$j_{end} = 1.0$ mA/cm²; d = 28 microns;

c. 1 percent of butynediol; 100 volt; 90 sec.$j_{end} = 0.64$ mA/cm²; d = 26 microns.

The ASTM salt spray test gave the following values at the cross cut:

In the case of bonderized sheet metal after 48 hours:
  a. 0.1 mm of rust zone, 3 mm of blister zone;
  b. 0.1 mm of rust zone, 3.5 mm of blister zone;
  c. 0.5 mm of rust zone, 6 mm of blister zone.

In the case of the unbonderized sheet metal after 24 hours:
  a. 1 mm of rust zone, 4.5 mm of blister zone;
  b. 1.5 mm of rust zone, 4.5 mm of blister zone;
  c. 1.8 mm of rust zone, 7 mm of blister zone.

The combination of arylamine + butynediol thus gives a clear improvement in the corrosion resistance over both the butynediol alone (Example 3(c)) and the arylamine alone (Example 1(d) and 1(e)).

EXAMPLE 4

A binder based on a commercial maleic oil is treated in this Example.

(a) for the production of the comparative liquor, 200 g of maleic oil having an acid number of 79 is ground twice in a cone mill with 25.1 g of dimethylethanolamine, 325 g of water and 100 g of pigment (TiO$_2$, Kronos RN 59). The solution is adjusted to a binder content of 10 percent (2 kg of bath solution) with 1320 g of water. To prepare the coating liquor according to the process of the invention, 20 percent of the DMEA is replaced in each case by:

b. trimethylbenzylammonium hydroxide (100 ml 0.57 molar solution);
c. N,N-bis-(2-hydroxyethyl)-m-toluidine (11.1 g);
d. diethylaminopropyne (8.1 g).

The deposition parameters and the results of the ASTM salt spray test (bonderized sheet metal) are given in Table 2. The coating is baked for twenty minutes at 170°C.

TABLE 2

| System | U (V) | τ (sec) | j$_{end}$ (mA/cm$^2$) | d (μ) | rust zone (mm) at cut | blister zone (mm) at cut |
|---|---|---|---|---|---|---|
| (a) | 100 | 60 | 2 | 26 | 3 | 8 |
| (b) | 125 | 60 | 1.5 | 25 | 2 | 5 |
| (c) | 95 | 60 | 3 | 28 | 1.5 | 4 |
| (d) | 110 | 60 | 3.5 | 28 | 0.5 | 2 |

Here again there is a marked improvement in the resistance to corrosion in the presence of the bases of the invention.

We claim:

1. A coating composition containing a water dispersible or water soluble acid binder having an acid number of from 20 to 400 at least partly present in the form of a salt thereof with a basic compound for the production of coatings on a conducting surface by electrodeposition in which from 0.1 to 50 percent of the neutralization equivalent of the acid binder is present as a salt of at least one compound from the group consisting of an N-hydroxyalkyl substituted arylamine, oxaalkyl substituted arylamine, an alkynylamine, a quaternary ammonium hydroxide having at least one aromatic ligand, and phosphonium hydroxide having at least one aromatic ligand.

2. A coating composition as claimed in claim 1 which contains at least one further conventional additive from the group consisting of pigments, fillers, antisedimentation agents, antifoams, flow improvers, stabilizers and antioxidants, with the proviso that clay does not fall within the scope of any of the members of the group.

3. A coating composition as claimed in claim 1 which also contains a conventional non-basic corrosion inhibitor.

4. A coating composition as claimed in claim 1 wherein from 1 to 25 percent of the neutralization equivalent of the acid binder is present as a salt of at least one arylamine having the general formula:

in which R denotes phenyl, phenyl or naphthyl bearing as a substituent one or more alkyl, oxyalkyl, oxaalkyl or alkoxyl groups of one to eight carbon atoms or an aryl or aralkyl group of seven to twenty carbon atoms and R$^1$ and R$^2$ are identical or different and each denotes hydrogen, alkyl, oxaalkyl or hydroxyalkyl of one to four carbon atoms or aralkyl of seven to twenty carbon atoms.

5. A coating composition as claimed in claim 1 wherein 1 to 25 percent of the neutralization equivalent of the acid binder is present as a salt of at least one alkynylamine of the general formula:

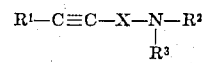

in which R$^1$, R$^2$ and R$^3$ are identical or different and each denotes hydrogen, linear or branched alkyl of one to four carbon atoms or substituted linear or branched alkyl of one to four carbon atoms bearing as substituent a hydroxyl, alkoxyl or acyloxy group and X denotes alkylene of one to four carbon atoms.

6. A coating composition as claimed in claim 1 wherein from 1 to 25 percent of the neutralization equivalent of the acid binder is present as a salt of a quaternary ammonium hydroxide of the general formula:

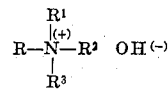

in which R denotes aryl or aralkyl of six to ten carbon atoms, aryl or aralkyl bearing as a substituent an alkyl, oxyalkyl, oxaalkyl or alkoxyl group, and R$^1$, R$^2$ and R$^3$ are identical or different and may have the same meaning as R or may denote linear or branched or cyclic alkyl of one to twenty carbon atoms.

7. A coating composition as claimed in claim 1 wherein from 1 to 25 percent of the neutralization equivalent of the acid binder is present as a salt of at least one quaternary phosphonium hydroxide of the general formula:

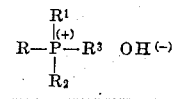

in which R denotes aryl or aralkyl of six to ten carbon atoms, substituted aryl or aralkyl in which the substituent is alkyl, oxyalkyl, oxaalkyl or alkoxyl and R$^1$, R$^2$ and R$^3$ are identical or different and each has the same meaning as R or denotes linear, branched or cyclic alkyl of one to twenty carbon atoms.

8. A coating composition as claimed in claim 1, wherein for salt formation from the acid binder there is used from 99.9 to 50 percent of its neutralization equivalent of at least one basic compound from the group consisting of an alkali metal hydroxide, an alkali metal carbonate, an alkali metal bicarbonate, an alkali metal alkoxide, ammonia, an organic C$_2$ to C$_{10}$ aliphatic or cycloaliphatic primary, secondary or tertiary amine, a hydrogenated nitrogenous C$_4$ to C$_6$ heterocycle or an organic $C_2$ to $C_{10}$ aliphatic primary, secondary or tertiary amine which contains from one to three hydroxyl groups.

9. A coating composition as claimed in claim 1 wherein from 0.1 to 50 equivalent percent of the basic substance conventionally used for salt formation with the acid binder is replaced by at least one basic compound selected from the group consisting of an arylamine, alkynylamine and a quaternary ammonium or phosphonium hydroxide having at least one aromatic ligand.

10. A coating composition as claimed in claim 1 wherein the acid binder is a polycarboxylic acid resin.

11. A coating composition as claimed in claim 10 wherein the polycarboxylic acid resin is an unsaturated polyester or an alkyd resin.

12. A coating composition as claimed in claim 10 wherein the polycarboxylic acid resin is a maleic oil or an expoxide ester.

13. A coating composition as claimed in claim 10 wherein the polycarboxylic acid resin is a copolymer containing carboxyl groups.

14. A coating composition as claimed in claim 10 wherein the polycarboxylic acid resin is a copolymer containing polymerized units of at least one compound selected from the group consisting of acrylic acid, methacrylic acid, crotonic acid, maleic acid, fumaric acid, itaconic acid and a maleic monoester of an alkanol of one to twenty carbon atoms.

15. A coating composition as claimed in claim 10 which additionally contains a phenoplast or aminoplast condensate which is compatible with water.

* * * * *